(12) United States Patent
Berliet

(10) Patent No.: US 6,706,790 B1
(45) Date of Patent: Mar. 16, 2004

(54) POLYAMIDE-BASED COMPOSITION OF HIGH LIGHT STABILITY

(75) Inventor: Jérôme Berliet, Lyons (FR)

(73) Assignee: Nyltech France, Saint-Fons (FR)

( * ) Notice: Subject to any disclaimer, the term of this patent is extended or adjusted under 35 U.S.C. 154(b) by 0 days.

(21) Appl. No.: 09/819,093

(22) Filed: Mar. 26, 1999

(65) Prior Publication Data
(65)

Related U.S. Application Data

(63) Continuation of application No. 08/913,175, filed as application No. PCT/FR96/00359 on Mar. 7, 1996, now abandoned.

(30) Foreign Application Priority Data

Mar. 10, 1995 (FR) .............................. 95 03158

(51) Int. Cl.$^7$ .............................................. C08L 77/00
(52) U.S. Cl. ...................... 524/255; 524/252; 524/254; 524/606
(58) Field of Search ............................... 524/606, 255, 524/252, 254

(56) References Cited

U.S. PATENT DOCUMENTS

| | | | | |
|---|---|---|---|---|
| 4,391,943 A | * | 7/1983 | Scheetz | 524/538 |
| 4,839,405 A | * | 6/1989 | Speelman | 524/99 |

FOREIGN PATENT DOCUMENTS

| | | | |
|---|---|---|---|
| EP | 0 052 944 | * | 6/1982 |
| EP | 0 610 155 | * | 8/1994 |

* cited by examiner

*Primary Examiner*—Patricia A. Short

(57) ABSTRACT

The present invention relates to a polyamide-based composition used for the manufacture of moulded components exhibiting high resistance to attack by light and/or weathering. The invention more particularly relates to compositions comprising a thermoplastic matrix based on semi-crystalline polyamide, a black pigment and optionally reinforcing fillers. This composition is characterized by the presence of thermally stabilizing additives, in combination with a black pigment comprising at least one black pigment of inorganic origin and with at least additives which decrease the effect of radiation on the degradation of the polymeric matrix. The compositions of the invention exhibit improved stability in their properties under the effect of light and/or weathering, for example similar to that of polyester.

10 Claims, No Drawings

POLYAMIDE-BASED COMPOSITION OF HIGH LIGHT STABILITY

This application is a Continuation Application of U.S. application Ser. No. 08/913,175, filed on Mar. 7, 1996, now abandoned, which is an application under 35 U.S.C. Section 371 of International Application Number PCT/FR96/00359, filed Mar. 07, 1996.

The present invention relates to a polyamide-based composition exhibiting high stability towards light.

It more particularly relates to a polyamide-based composition comprising a black pigment.

Compositions based on a thermoplastic material comprising or not comprising reinforcing fillers are used for the manufacture of various moulded components such as components for electrical connections, components of a heat engine, such as motor vehicle engines, or various components attached to the body of different devices or forming part of this body. Mention may be made, by way of example, of control panels of different domestic electrical appliances or components attached inside the passenger compartment of a vehicle or to the body of the latter. Thus, rearview mirror castings, handles or elements of the instrument panel can be produced by moulding a composition based on a thermoplastic material.

Among thermoplastic materials, polyamides are used for producing components requiring good mechanical properties and/or good temperature behaviour.

For components which are permanently exposed to light and/or to weathering, the material is required to be resistant to these two factors, that is to say to retain its properties after its exposure to light and/or to weathering.

Among thermoplastic materials, polyamides have a lower resistance to attack by light and/or weathering than, for example, thermoplastic polyester.

One of the objects of the present invention is to provide a polyamide composition exhibiting an improved stability in its properties under the effect of light and/or weathering, for example similar to that of polyester.

To this end, the invention provides a composition comprising a thermoplastic matrix based on semi-crystalline polyamide comprising a black pigment and optionally reinforcing fillers. This composition is characterized by the presence of thermally stabilizing additives, in combination with a black pigment comprising at least one black pigment of inorganic origin and with at least additives which decrease the effect of radiation on the degradation of the polymeric matrix.

The additives which decrease the effect of radiation on the degradation of the polymeric matrix comprise antioxidizing compounds and/or compounds known as UV stabilizers or which absorb radiation such as U.V. radiation.

These additives are, for example, described in the work entitled "Oxidation, Inhibition in Organic Materials", edited by Jan Pospisil and Peter P. Klemchuk (1990) or in European Patent Application No. 0,610,155.

Mention may be made as antioxidizing compounds suitable for the invention, by way of example, of monophenols which are unsubstituted or substituted by alkyl groups such as 2,6-di-tert-butyl-4-methylphenol or analogous compounds; hydroquinones which are unsubstituted or substituted by alkyl groups such as 2,6-di-tert-butyl-4-methoxyphenol; hydroxylated phenyl thioethers such as 2,2'-thiobis(6-tert-butyl-4-methylphenol); bisphenols which are unsubstituted or substituted by alkyl groups such as 2,2'-methylenebis-(6-tert-butyl-4-methylphenol); benzene compounds such as 1,3,5-tri(3,5-di-tert-butyl-4-hydroxybenzyl)-2,4,6-trimethylbenzene; acylated aminophenols; hindered amines such as N,N'-di-isopropyl-p-phenylenediamine, phenothiazine, 1,4-benzothiazine or analogous compounds.

Use may also be made of antioxidants known as "secondary" antioxidants such as aromatic or aliphatic phosphites or phosphonites or alkali metal salts of phenylphosphonic acid or of hypophosphorous acid.

Mention may be made as light-stabilizing compounds or compounds which absorb UV radiation, by way of examples, of 2-(2'-hydroxyphenyl)benzotriazoles such as 2-(2'-hydroxy-5'-methylphenyl)benzotriazole or analogous compounds; 2-hydroxybenzophenones such as 3,3,'-methylenebis(2-hydroxy-4-methoxybenzophenone); esters of benzoic acids which may or may not be substituted such as bis(4-tert-butylbenzoyl)resorcinol; acrylates; sterically hindered amines; oxalic acid diamides; hydroxyphenyl-s-triazines; or nickel compounds such as complexes of nickel with 2,2'-thiobis[4-(1,1,3,3-tetramethylbutyl)phenol].

When one of these additives is present in the composition, its concentration by weight is between 0.05% and 5% approximately, with respect to the overall composition.

In the case where these two categories of compounds are present, which represents a preferred embodiment of the invention, the overall concentration by weight of these compounds is between 0.10% and 5% approximately with respect to the overall composition.

According to another characteristic of the invention, the composition can comprise an additive which decreases the rate of crystallization of the polymer constituting the matrix and more particularly polyamide. This additive makes it possible to improve the surface condition of the moulded component and also to improve the surface appearance of the component after exposure to radiation such as light and/or to weathering.

The compounds which decrease the rate of crystallization which are suitable for the invention are chosen from the group comprising amorphous polymers or semi-crystalline polymers exhibiting a crystallization temperature below that of the polyamide which forms the matrix of the composition. These two polymer types also have the property of being compatible with the polyamide which forms the matrix of the composition, that is to say being able to be mixed with the said polyamide without the risk of phase separation.

The compounds which decrease the rate of crystallization can also be chosen from the condensation products of aniline with nitrobenzene or polyols, such as glycol or polyglycols.

According to a preferred characteristic of the invention, the compound which decreases the rate of crystallization is a condensation product of aniline with nitrobenzene and more particularly nigrosine or its derivatives such as nigrosine hydrochloride.

According to a characteristic of the invention, the concentration by mass of black pigment of inorganic origin is at least equal to approximately 0.05% of the overall composition and preferably of between 0.1% and 2% approximately.

The thermal stabilizers are those conventionally used in the field of polyamides, such as metal/halogen combinations such as the copper iodide or potassium iodide system, for example. These compounds are present at a concentration by weight of between 0.03% and 1% of the overall weight of the composition.

When the additive which decreases the rate of crystallization is nigrosine or one of its derivatives, the overall concentration by weight of nigrosine and of black pigment of inorganic origin is advantageously at least equal to 0.10% of the overall composition and advantageously between 0.15 and 0.5% approximately.

In the other cases, the additive which decreases the rate of crystallization is present according to a concentration by weight at least equal to 0.5% and advantageously of between 1% and 10% of the overall composition.

The compositions of the invention can also comprise other pigments in order to obtain compositions of different colours, in particular white pigments for producing components which are grey in colour.

The compositions of the invention can comprise a reinforcing filler composed of inorganic fibres, such as glass fibres or carbon fibres, and/or organic fibres, such as fibres made of heat-stable polymer such as fibres made of poly(p-phenylene terephthalamide), for example, or of inorganic particles, such as kaolin, talc or mica. They can comprise a mixture of these.

The composition of the invention exhibits a very good surface appearance, that is to say that the fillers and the pigments do not appear at the surface of the component.

The concentration by weight of reinforcing filler can be high and in particular greater than 10% by weight with respect to the weight of the overall composition.

The composition can also comprise other additives conventionally used for the manufacture of polyamide compositions intended to be moulded. Thus, lubricants, flame retardants, plasticizers, nucleating agents, agents for improving impact strength or other conventional additives may be mentioned.

Semi-crystalline polyamide which is suitable for the invention as matrix of the composition is understood to mean polymers obtained by a polycondensation reaction of saturated aliphatic dicarboxylic acids having from 6 to 12 carbon atoms, such as, for example, adipic acid, azelaic acid, sebacic acid, dodecanoic acid or a mixture of the latter, with biprimary diamines, preferably linear or branched saturated aliphatic biprimary diamines having from 4 to 12 carbon atoms, such as, for example, hexamethylenediamine, trimethylhexamethylenediamine, tetramethylenediamine, m-xylenediamine or a mixture of the latter; polyamides obtained either by direct homopolycondensation of an ω-aminoalkanoic acid containing a hydrocarbon chain having from 4 to 12 carbon atoms or by hydrolytic opening and polymerization of the lactams derived from these acids; copolyamides obtained from the starting monomers of the abovementioned polyamides, it being possible for the acid component of these copolyamides to additionally be partly composed of terephthalic acid and/or of isophthalic acid; and mixtures of these polyamides or their copolymers.

Mention will be made, as illustration of polyamides obtained by polycondensation of diacids and of diamines, of, for example:

Nylon 4,6 (polymer of tetramethylenediamine and of adipic acid),
Nylon 6,6 (polymer of hexamethylenediamine and of adipic acid),
Nylon 6,9 (polymer of hexamethylenediamine and of azelaic acid),
Nylon 6,10 (polymer of hexamethylenediamine and of sebacic acid),
Nylon 6,12 (polymer of hexamethylenediamine and of dodecanedioic acid).

Mention will be made, as illustration of polyamides obtained by homopolycondensation which may be suitable, of:

Nylon 4 (polymer of 4-aminobutanoic acid or of γ-butyrolactam),
Nylon 5 (polymer of 5-aminopentanoic acid or of δ-amylolactam),
Nylon 6 (polymer of ε-caprolactam),
Nylon 7 (polymer of 7-aminoheptanoic acid),
Nylon 8 (polymer of caprylolactam),
Nylon 9 (polymer of 9-aminononanoic acid),
Nylon 10 (polymer of 10-aminodecanoic acid),
Nylon 11 (polymer of 11-aminoundecanoic acid),
Nylon 12 (polymer of 12-aminododecanoic acid or of laurolactam).

Mention will be made, as illustration of copolyamides, of, for example:

Nylon 6,6/6,10 (copolymer of hexamethylenediamine, of adipic acid and of sebacic acid),
Nylon 6,6/6 (copolymer of hexamethylenediamine, of adipic acid and of caprolactam).

The preferred polyamides of the invention are polyamides 6,6, polyamides 6 and copolyamides 6,6/6.

The compositions of the invention are obtained by conventional processes for mixing the different additives, either by mixing in molten medium in a mixer or by passing into a single- or twin-screw extruder.

The composition thus obtained, also known as a compound composition, is advantageously produced in the form of granules obtained by cutting off one or a number of rods formed at the extruder outlet.

According to an embodiment of the invention, at least a portion of the pigments and additives is added to the polyamide in the form of a masterbatch, the matrix of which is a polyamide of the same nature as that of the composition or different, and in which masterbatch the pigments and/or the additives are present at a high concentration which can range up to 50% by weight. This process makes possible better dispersion of the additives and pigments in the composition.

The moulded components are obtained by shaping the compound by usual moulding techniques such as moulding by injection, injection blow moulding, gas injection, injection-compression, multicomponent injection or analogous techniques.

The properties of the compositions are determined by the following methods:

Viscosity number: this number is measured on a polymer solution containing 0.5 g of polymer dissolved in 100 ml of a formic acid/water (90/10) solvent at a temperature of 25° C. according to ISO Standard 307/1984/015.

Crystallization temperature on cooling: determination by the D.S.C. method according to ISO Standard 1218 during the cooling of the premelted polymer.

Impact strength: determined by measuring the "unnotched" Charpy impact resistance according to ISO Standard 179/1eU.

Surface appearance of the moulded components: this appearance is assessed by visual estimation and comparison with a control with a good surface acting as reference. For this assessment, a component of "housing"-type appearance is prepared by slow injection.

Stability with respect to exposure to UV radiation (Xenotest): this stability is measured by use of the artificial insolation devices: Xenotest or Weather-O-Meter Atlas CI35. The strength of the colour is evaluated with respect to a scale of greys, in accordance with French Standard NF G 07-011. The duration of the test is defined with respect to a scale of blues comprising a number of samples in accordance with French Standard NF G07-012.

During each cycle, the sample is sprayed with water for 3 min every 20 min, the duration of spraying being brought to 23 min every 6 hours. The sample is illuminated for 21 hours and then not exposed to light for 3 hours. This procedure is carried out with the Weather-O-Meter.

The examples given below, solely by way of indication, will illustrate the invention and the advantages of the latter.

In the examples below, the concentrations are expressed as percentage by weight of the compound with respect to the overall weight of the composition, except when otherwise indicated.

The compositions are obtained by feeding a twin-screw extruder with a polyamide in the form of granules and with the different additives of which the composition to be manufactured is composed. The mixing conditions are those generally used for the manufacture of polyamide-based compounds.

The pigments are generally fed in the form of one or a number of masterbatches, that is to say of a polyamide-based composition comprising a high pigment concentration. This method of introduction of the pigments is solely a preferred method.

Moreover, these masterbatches can also contain other additives such as heat stabilizers, lubricants or analogous additives.

The different components used in the tests below are:
copolyamide 6,6/6 according to a 90/10 ratio
glass fibres
KI
CuI
inorganic black:
  Monarch black marketed by the Company Cabott
Crystallization retarder:
  PA 6 (Example 10)
  Oisol black N (nigrosine base) marketed by the Company Bayer (Examples 7 and 9)
  Spirit Black BB (nigrosine hydrochloride) marketed by the Company Simpson (other examples)
Antioxidant:
  Irganox 1098 (marketed by the Company Ciba-Geigy) (Examples 1, 2, 3, 5 and 10)

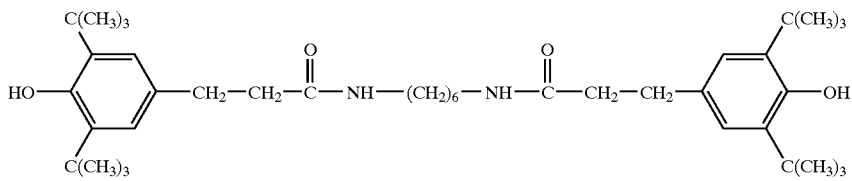

Irgafox 168 (marketed by the Company Ciba-Geigy) (Example 6)

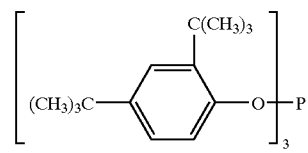

Light stabilizer:
  Tinuvin 770 (marketed by the Company Ciba-Geigy) (Examples 1, 2, 3 and 4)

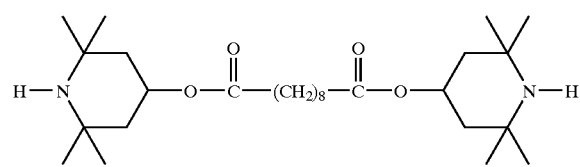

Tinuvin 1577 (marketed by the Company Ciba-Geigy) (Example 10, as a mixture with Tinuvin 770 in a 1577/770 ratio of 1/2)

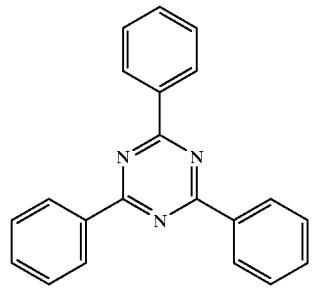

Mixed stabilizers:
  Tinuvin B 1166 FF (marketed by the Company Ciba-Geigy) (Examples 7, 8 and 9)

| Mixed stabilizers: | |
|---|---|
| Tinuvin B 1166 FF (marketed by the Company Ciba-Geigy) (Examples 7, 8, and 9) mixture of: Irganox 1098 | 25% |
| : Irgafox 168 | 25% |
| : Tinuvin 770 | 50% |

The granules of each composition were moulded in order to produce, on the one hand, test pieces on which the mechanical properties and the resistance to UV radiation were measured and, on the other hand, components for assessing the surface condition.

The compositions in accordance with the invention and their properties are collated in Table 1 below:

Example 11 also comprises a white pigment composed of $TiO_2$ with a concentration of 0.095% by weight. The composition has a grey colour.

TABLE 1

| | | 1 | 2 | 3 | 4 | 5 | 6 | 7 | 8 | 9 | 10 |
|---|---|---|---|---|---|---|---|---|---|---|---|
| Polyamide | | 68.37 | 78.13 | 78.36 | 78.70 | 68.79 | 68.79 | 68.26 | 78.40 | 77.33 | 63.65 |
| Glass fibres | | 30 | 20 | 20 | 30 | 30 | 30 | 30 | 20 | 30 | 30 |
| Thermal | CuI | 0.044 | 0.05 | 0.05 | 0.044 | 0.044 | 0.044 | 0.028 | 0.05 | 0.044 | 0.044 |
| stabilizers | KI | 0.24 | 0.27 | 0.27 | 0.239 | 0.239 | 0.239 | 0.015 | 0.27 | 0.236 | 0.236 |
| Lubricant | | 0.41 | 0.47 | 0.47 | 0.408 | 0.408 | 0.408 | 0.172 | 0.31 | 0.27 | 0.27 |
| Antioxidants | | 0.109 | 0.125 | 0.125 | — | 0.109 | 0.109 | — | — | — | 0.109 |
| Light stabilizer | | 0.218 | 0.25 | 0.25 | 0.218 | — | — | 0.5 | 0.5 | 0.436 | 0.327 |
| Inorganic black pigment | | 0.409 | 0.468 | 0.234 | 0.204 | 0.204 | 0.204 | 0.129 | 0.233 | 0.202 | 0.179 |
| Crystallization retarder | | 0.204 | 0.234 | 0.234 | 0.204 | 0.204 | 0.204 | 0.129 | 0.233 | 0.202 | 5 |
| Ageing after 6 cycles | | 4/5 | 4/5 | 4 | 4 | 4 | 4 | 4/5 | 4/5 | 4 | 4 |
| Surface appearance | | = | +1 | +2 | = | = | = | = | = | = | = |
| "Unnotched" Charpy impact kJ/m$^2$ | | 77.9 | 44.8 | 53.7 | 77.1 | 78.2 | 80.4 | 64.3 | 41.3 | 69 | — |

Tests of the behaviour towards UV ageing were carried out with commercial compositions based on a poly(butylene glycol terephthalate) matrix.

Thus, the composition marketed by the Company Akzo under the name of "Arnite TV 4460 K", with a grey colouring, has the notation 4/5 after 6 ageing cycles.

Likewise, the composition T 29000 V 30 marketed by the Company Rhône-Poulenc Chimie has the notation 4/5 after 6 ageing cycles.

These tests demonstrate that the compositions in accordance with the invention comprising a polyamide as thermoplastic matrix have a resistance to light exposure of the same order of magnitude and even equivalent to that of compositions with a polyester matrix.

What is claimed is:

1. A composition comprising a thermoplastic matrix based on semi-crystalline polyamide, and pigments comprising:

(1) one or more black pigments comprising at least one black pigment of inorganic origin at a concentration by weight of between 0.05 and 2% of the overall composition;

(2) one or more compounds which decreases the effect of light or U.V. radiation on the degradation of the polymeric material forming the matrix of the composition at a concentration by weight of between 0.05 and 5% of the overall composition;

(3) nigrosine or a nigrosine derivative which decreases the rate of crystallization of the thermoplastic matrix at a concentration by weight of between 0.10 and 0.50% of the overall composition; and (4) CuI and KI at a concentration by weight of between 0.03% and 1% of the overall composition.

2. A composition according to claim 1, wherein the compound (2) is an antioxidizing compound, a compound absorbing light, a compound absorbing U.V. radiation, or their combinations.

3. A composition according to claim 2, wherein compound (2) comprises a combination of one or more antioxidizing compounds and one or more light absorbing compounds present in an amount between 0.10% and 0.50% by weight of the overall composition.

4. A composition according to claim 2, wherein the antioxidizing compound is a sterically hindered phenolic compound, an aromatic amine, an alkyl phosphite, or an alkyl phosphonite.

5. A composition according to claim 1, wherein the concentration of black pigment of inorganic origin is between 0.1% and 2%.

6. A composition according to claim 1, wherein the compound (2) is selected from the group consisting of benzotriazole, 2-hydroxybenzophenone, acrylate, substituted benzoic acid ester compounds, unsubstituted benzoic acid ester compounds, sterically hindered amines, nickel complexes, and oxalic acid diamides.

7. A composition according to claim 1, wherein the derivative of nigrosine is nigrosine hydrochloride.

8. A composition according to claim 1, further comprising reinforcing fillers being glass fibres, carbon fibres, fibres made of thermostable polymer, kaolin, talc or mica.

9. A composition according to claim 1, wherein the polyamide is PA 6,6; PA 6; PA 4,6; or their copolymers.

10. A method of manufacturing articles comprising the step of molding the composition as defined in claim 1.

* * * * *